Patented Feb. 19, 1952

2,585,951

UNITED STATES PATENT OFFICE 2,585,951

FOOD PRODUCT FROM WHEY

James P. Malkames, Jr., Silver Spring, Md., assignor to the United States of America as represented by the Secretary of Agriculture No Drawing. Application January 30, 1951,
Serial No. 208,647

2 Claims. (Cl. 99—116)

(Granted under the act of March 3, 1883, as
amended April 30, 1928; 370 O. G. 757)

The invention herein described may be manufactured and used by or for the Government of the United States of America for governmental purposes throughout the world without the payment to me of any royalty thereon.

This application is a continuation in part of my patent application Serial No. 785,429, filed November 12, 1947.

This invention relates to a new type of dairy food and a process by which it is made. It relates particularly to the conversion of a precipitate obtained from separated or unseparated whey into a nutritious product having better flavor, smoother body, and greater ease of digestibility than products prepared heretofore from whey solids. The application of this process is not limited to any one of the common types of whey such as Cheddar-cheese or Swiss-cheese whey, but is suitable for all types of whey.

The primary objection to the use of whey precipitate for human consumption has been its coarse particle size, which produces a chalky, granular sensation when eaten. Attempts to improve the body by natural curing under fixed temperature and humidity conditions resulted in off flavors and little or no improvement, even after months of curing. I have found that through my method of enzymatic digestion employing a specific type of enzyme, I am able to overcome this objection. I have been able to surmount the difficulty of undesirable flavor development which usually appears during and after enzymatic digestion of organic substances.

An object of this invention is to produce a new and appetizing dairy food from whey precipitated curd salvaged from whey.

Another object of this invention is to increase greatly the monetary value of whey by manufacturing from it a valuable, palatable dairy food for humans. Whey is mainly regarded as a waste byproduct of cheese and casein manufacture. Whey, although finding slight use in animal feeds, is for the most part discarded, since the labor and expense involved in its collection, transportation and processing often makes this use economically unfeasible.

A further object of this invention is to provide an economical solution for the sewage disposal problem associated with waste whey. Because of the lower organic-matter content of the whey after the curd precipitate is removed, the pollution effect of the whey on neighboring streams is greatly reduced. Where no streams are available, the lower biological oxygen demand makes it possible to treat the whey more easily, quickly and cheaply so as to destroy its nuisance value.

Yet another object of this invention is to produce a dairy food from the precipitated curd that has exceptionally good keeping qualities; these excellent keeping qualities being achieved in our process as a result of the high temperature treatment and the low pH of the final product.

Other objects and advantages will become apparent from the following disclosure.

In accordance with my invention the whey precipitate is partially broken down by means of controlled treatment with a proteolytic-enzyme material of fungal origin. In order to produce the correct or best degree of partial digestion rather than complete liquefaction of the precipitate, the process is accurately controlled with regard to pH, enzyme concentration, salt content (NaCl), time period for which the enzyme is allowed to react, and the temperature at which the enzyme reaction is carried out.

The steps in the process, in the order in which they are performed, are:

(1) The controlled digestion of the whey precipitate by means of the proteolytic enzyme.

(2) Heat treatment of the mixture so as to inactivate the enzyme, thus preventing its further reaction.

(3) Addition to the treated precipitate of a cream mixture which has undergone a flavor-producing, microbial, culturing process.

(4) Pasteurization of the mixture so produced.

(5) Homogenization of the mixture.

For instance:

A weighed amount of the whey precipitate, containing 6–15% fat, 68–80% moisture, and 13.0–26.0% solids not fat, and having a pH of from 5.0–6.0, is placed in a covered mixing kettle and an appropriate amount, 1 to 2%, of salt (NaCl) is thoroughly mixed into the precipitate. After raising the temperature to within the range of 20°–50° C., the enzyme material is added in the concentration of 80–200 grams per 100 lbs. of precipitate. The enzyme that we prefer to use is protease Rhozyme, that is, Rhozyme P-11, a commercially available enzyme predominately proteolytic and of fungal origin manufactured by Rohm and Haas Company, Philadelphia, Pennsylvania; however, other proteolytic enzymes of similar nature may be used. The mixture is digested for a time period extending from 15 mins. to 24 hrs., the time period depending on the temperature at which the reaction is held and on the amounts of enzyme and salt which were added. The conditions for the enzyme reaction can be so controlled as to yield uniform results from day to day. It is much preferred that the degree of digestion fall within the range of 0.10% to 0.20% of amino nitrogen (Formol titration) in the solids-not-fat. When the desired type and degree of enzymic change have been accomplished, the enzyme is inactivated by rapidly raising the temperature to 80°–95° C., and holding the mixture at this temperature for 15 minutes. The material may be stored at 0° C. for several days or used immediately.

The milk cream which is to be added to the treated precipitate contains originally from 40–80% fat. It is mixed with dried or liquid skim milk, or a mixture of the two. The amounts of dried and liquid skim milk added to the cream depends on the composition desired for the finished product. Knowing the composition of the cream and of the whey precipitate, which varies widely, and the proportions in which these two are to be mixed, it is possible to adjust the solids added to the cream in the form of skim milk in order to obtain a final product having a content of 15.0–20.0% solids-not-fat, 24–35% fat, and 50–60% moisture, and a pH of 4.5–5.5. The mixture of cream and skim milks is pasteurized, cooled to the desired incubation temperature and then inoculated with a pure culture of *Streptococcus lactic* and *Lactobacillus casei*, or a mixture of the two. These organisms contribute to the flavor and body of the final product by converting a portion of the lactose present into lactic acid and other fermentation products. The cream is then cultured at the desired temperature for a period of 24–48 hours. When the cream mixture develops a pH of 4.5 to 4.7 with *S. lactis* or 4.0 to 4.4 with *L. casei*, it is ready to be mixed with the partially digested whey precipitate.

The digested precipitate and the cultured cream are thoroughly mixed together with locust bean gum, with additional salt, and with or without sodium citrate and pasteurized at a temperature of from 85–95° C. for from 5–15 minutes, immediately homogenized, by any homogenizing method, at from 2000 to 4000 lbs. pressure and immediately packaged. The high heat treatment of 85–95° C. for 5 to 15 minutes and the long period of cooling with a pH of from 4.5 to 5.5 destroys practically all types of organisms, thereby giving the product excellent keeping qualities.

If the cultured cream mixture is available for use during the processing of the precipitate, the cream may be added immediately after enzyme inactivation, thus obviating the necessity of reheating both as described above in the preceding paragraph.

The product can be modified by addition of fruits, or nuts, or meats, or condiments for flavor effects; smoking or adding smoked flavor compounds; fortifying with vitamins; mixing or blending with cheese; alteration of composition for sandwich spreads; utilization of enzymes of a similar nature to produce desired results; utilization of accompanying enzymes such as lipase to produce desired flavors.

The following method for obtaining the whey precipitate is preferred: Under constant agitation, 200 cc. of concentrated glacial acetic acid diluted to 600 cc. with water, is added to 600 lbs. of sweet, curd-free whey (pH 6.0–6.6) at a temperature of 95° C. When the coagulation appears to be complete, agitation is stopped and the coagulum is collected in any convenient manner and is spread out on draining racks to allow drainage (2–24 hrs.) of the liquid whey. Slight modifications, such as the addition of alkali to adjust the pH to within the desired range, may be made in obtaining the whey precipitate from high acid whey.

The composition of the whey precipitate obtained from separated or unseparated whey will vary as follows: butterfat 0.1% to 20.0%, moisture 50.0% to 85.0%, solids-not-fat 13.0% to 50.0%, and minor portions of milk sugar, ash, and riboflavin.

A specific example of the preferred procedure of this invention is as follows:

*Example 1*

One hundred pounds of whey precipitate, pH 5.53, was mixed with 1.10% salt and 160 grams Rhozyme P-11 (Rhozyme protease). The mixture under constant agitation was heated to 38–43° C. and held for 30 minutes. It was further heated to 85° C. and held for 15 minutes to inactivate the enzyme. This phase completes the partial digestion of the whey precipitate.

The bath of partially digested whey precipitate containing 10.0% fat, 73.8% moisture, and 13.2% solids-not-fat was mixed with 100 pounds of standardized sour cream containing a given portion of dried skim milk.

The fortified sour cream was prepared as follows: 15 pounds of cream containing 40.0% fat was standardized by adding 1.7 pounds of dried skim milk, a quantity sufficient to produce a fortified cream the composition of which was such that when mixed with the partially digested precipitate and other minor ingredients resulted in a finished product containing 25.5% fat, 57.3% moisture, and 17.6% solids-not-fat and a pH of 4.33. The fortified cream was next heated to 165° C. and held for 30 minutes, then cooled to about 37° C. and inoculated with 50 cc. of *Lactobacillus casei*. The temperature was maintained at 37° C. for 48 hours, at which time the pH of the mix was 4.33, indicating sufficient fermentation.

Eleven and one-half pounds of curd and 11½ pounds of soured cream were heated slowly under constant agitation to 50° C. Fifty grams of salt, 63 grams of locust bean gum, and 108 grams of sodium citrate were then incorporated into the mix and the temperature was raised to 95° C. and held for 5 minutes. It was then viscolized at 2000 lbs. pressure and packaged in an air sealed container. Other available gums and emulsifiers or combinations thereof may be used.

*Example 2*

Six hundred pounds of cheese whey liquid was placed in a jacketed Swiss-cheese kettle, a solution containing 25% of sodium hydroxide was added with stirring until the pH of the whey was 6.4 and, with constant agitation, the whey was heated to 200° F. In the meantime 85 pounds of whey was being cooled in another cheese kettle. Four hundred cubic centimeters of glacial acetic acid was diluted with warm water to a volume of 9400 cc. and this solution was added slowly to the 600 lbs. of hot whey until precipitation of protein appeared to be complete. The agitator was stopped and the protein curd was dipped from the whey in a Swiss-cheese dipping cloth and placed in the 85 pounds of cool whey. The curd was broken up by stirring until the particles were of the size of grains of wheat, the agitation was then stopped and the curd allowed to stand in the whey for 3 hours. The curd was then dipped in a cloth and hung to drain at room temperature for 24 hours. The drained curd was weighed out into 4 five-pound portions. To a five-pound portion, 0.25 pound of salt was added and thoroughly mixed in. A mixture of 0.05 pound of a protease and 0.2 pound of an active lactic starter was then added to each portion of the salted curd and the components were thoroughly mixed by stirring in a mechanical mixer. It was then packed in a Roquefort-cheese hoop and placed immediately in a curing room held at 45° F. and held there for 2 months.

Among the proteases that can be employed in the above Example 2 are papain, trypsin, trypsin in conjunction with erepsin and pepsin, and proprietary protease preparations such as Protease 15 and Rhozyme (products of Rohm and Haas Co.). The cheese prepared from Protease 15 was full-bodied, smooth-textured, and possessed an attractive flavor.

However, Rhozyme protease (Rhozyme P-11) excelled all of the proteases in the production of a palatable product acceptable for human consumption.

The products obtained from papain and trypsin were off-flavored and, although edible, would require extensive masking or other treatment to make them palatable to most humans. They could, however, be fed to cattle.

The whey used is preferably sweet whey.

Although the invention has been described and certain specific examples have been given by illustration, it is apparent that modifications and changes may be made without departing from the spirit and scope of the invention.

Having thus described my invention, I claim,

1. A process for preparing a palatable food comprising digesting precipitated whey curd in admixture with protease and about one to two percent of salt, based upon the curd, at about 20°–50° C. for about 15 minutes to 24 hours, until the degree of digestion falls within the range of 0.10% to 0.20% of amino nitrogen (formol titration) in the solids-not-fat, and then inactivating the enzyme.

2. A process for preparing a palatable food comprising digesting precipitated whey curd in admixture with protease and about one to two percent of salt, based upon the curd, at about 20°–50° C. for about 15 minutes to 24 hours, until the degree of digestion falls within the range of 0.10% to 0.20% of amino nitrogen (formol titration) in the solids-not-fat, and then inactivating the enzyme, said protease being a lactalbumin digesting protease of fungal origin.

JAMES P. MALKAMES, Jr.

REFERENCES CITED

The following references are of record in the file of this patent:

UNITED STATES PATENTS

| Number | Name | Date |
|---|---|---|
| 560,834 | Berstein | May 26, 1896 |
| 770,030 | Trillat | May 27, 1904 |
| 1,578,820 | Gere | May 18, 1925 |
| 1,704,458 | Brehm | Apr. 6, 1926 |
| 2,023,014 | Flanigan et al. | Jan. 6, 1933 |
| 2,232,248 | Lavett | Feb. 18, 1941 |

FOREIGN PATENTS

| Number | Country | Date |
|---|---|---|
| 248,998 | Great Britain | Mar. 18, 1926 |

OTHER REFERENCES

Journal Royal Agricultural Society (England), vol. 83, 1922. From D. A. L., article "The Utilization of Whey," pages 73 to 83.